INVENTOR
CLARENCE R. VAN NIEL
BY
ATTORNEY

United States Patent Office 2,700,910
Patented Feb. 1, 1955

2,700,910

PIVOTED JAW SPRING NUT REMOVER

Clarence R. Van Niel, Cleveland, Ohio, assignor to Tinnerman Products, Inc., Cleveland, Ohio, a corporation of Ohio Application January 6, 1954, Serial No. 402,579

2 Claims. (Cl. 81—5.1)

This invention relates in general to tools and deals, more particularly, with a tool for removing sheet metal spring nuts, and the like, from secured position on associated studs without damage to the spring nuts or the studs in order that they be reused with their original effectiveness in the same or similar fastening assemblies.

The sheet metal spring nuts, or the like, with which the tool of the present invention is employed, are constructed of relatively thin sections of sheet metal from which tongues or similar stud engaging elements are struck and formed to project upwardly out of the plane thereof in position for engaging a stud or bolt under tension. Due to the inherent resiliency of the spring metal and the manner in which the tongues are provided, such spring nuts are capable of quick, easy application to fastening position on a stud in a direct axial thrust by which the extremities of said tongues slide on the stud to the applied fastening position of the spring nut against the adjacent work surface or part secured where the spring nut is tensioned and the extremities of said tongues are embedded in the stud under tension in positively locked fastening engagement with the stud. The fastening action of the tongues of the spring nut is similar to that of a one-way clutch device in which the extremities of the tongues readily slide on the stud in one direction but prevent movement of the spring nut in the opposite direction toward removal from the stud by a reverse, axial pull or turning of the spring nut relatively to the stud.

In the use of sheet metal spring nuts for fastening plastic articles such as nameplates, and the like, onto an apertured panel or similar support, a highly practical and low cost fastening arrangement is provided by forming a plastic article with integral connecting studs which project through stud receiving apertures in the panel in position to be secured by sheet metal spring nuts which are easily and quickly pushed onto the projecting ends of said studs. It is often necessary or desirable to remove a plastic nameplate or other article thus secured in a completed assembly but due to the relatively fragile nature of the plastic studs, most attempts to release the spring nuts from secured position on the studs by ordinary methods result in breakage or mutilation of the studs such that the relatively expensive nameplate or similar article is useless and must be scrapped at a complete loss on the cost thereof. In other instances, when the spring nuts are secured on metal studs, it is seldom that the spring nuts can be removed from secured position on the studs without a deformation of the tongues thereof such that on reuse, the removed spring nuts lack their original effectiveness and it is preferable to scrap the same rather than risk a faulty fastening assembly.

A primary object of this invention, therefore, is to provide an improved tool for removing sheet metal spring nuts from secured position on associated studs, as and for the purposes aforesaid, wherein the tool includes means for actuating the tongues of a spring nut to release the extremities of the tongues from secured relation with the associated stud as necessary to permit removal of the spring nut without damage to either the spring nut or the stud such that they may be reused with their original effectiveness in the same or a similar fastening assembly.

Another object of the invention is to provide such a tool in which the means for releasing the tongues of a spring nut from secured position on a stud comprise a pair of spaced claws, or the like, adapted to engage the tongues of the spring nut in a manner to move the extremities of said tongues out of fastening engagement with the stud without damaging either the spring nut or the stud.

A further object of the invention is to provide a tool of the kind described in which the means for releasing the tongues of a spring nut from secured position on a stud comprise a pair of tool heads one of which includes a pair of spaced claws, or the like, adapted to straddle one side of the stud and fit under the tongues of the spring nut in position to lift the extremities of the tongues out of fastening engagement with the stud, in cooperation with the other tool head engaging and bolstering the opposite side of the stud against breakage or mutilation.

An additional object of the invention is to provide a tool embodying any one or more or all of the foregoing features of construction, and in which the tool is provided as a plier-like implement comprising a pair of tool heads one of which includes a pair of spaced, bevelled claws adapted to straddle one side of the stud and fit under the tongues of the spring nut in position to lift the extremities of said tongues out of fastening engagement with the stud, in cooperation with the other tool head engaging and bolstering the opposite side of the stud against breakage or mutilation.

Still another object of the invention is to provide a tool in accordance with the foregoing in which the tool head carrying the pair of spaced bevelled claws is replaceable in different sizes so that the tool is usable for removing various sizes of spring nuts from secured position on their associated studs.

Further objects and advantages of the improved tool of the invention, and other new and useful features in the construction, arrangement and general combination of elements thereof will be apparent as the following description proceeds with reference to the accompanying drawings, for purposes of illustration but not of limitation, in which like reference characters designate like parts throughout, and in which.

Figure 1:
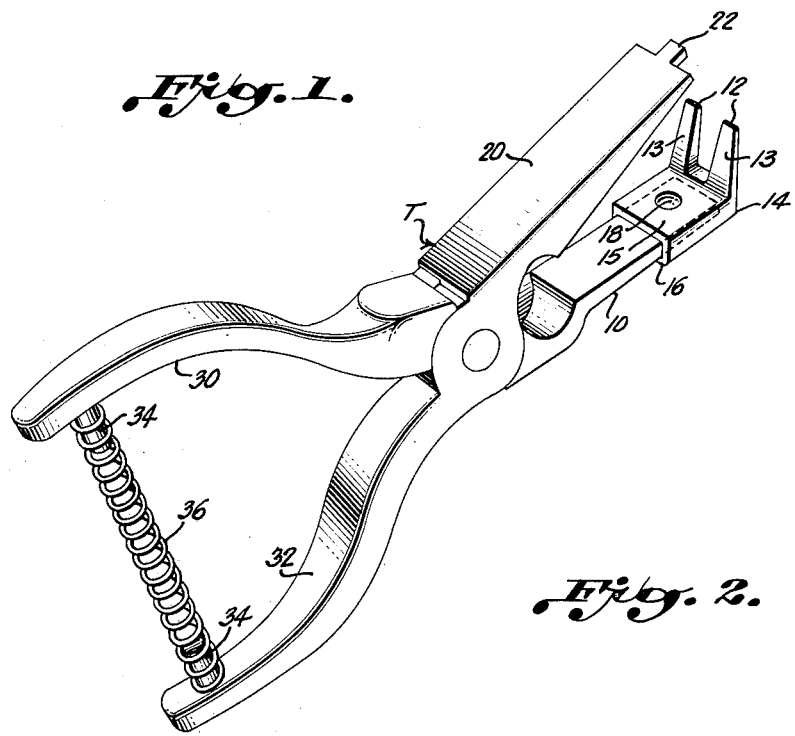
Fig. 1 is a perspective view of a preferred form of tool in accordance with the invention.
Figure 2:
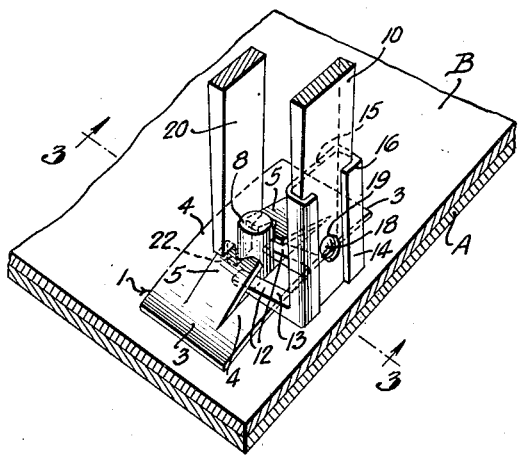
Fig. 2 is a perspective view showing the jaws of the tool, as applied to a spring nut secured on a stud, in position for releasing and removing the spring nut from the stud; and, Fig. 3 is a sectional view of Fig. 2 along line 3—3 looking in the direction of the arrows.
Figure 3:
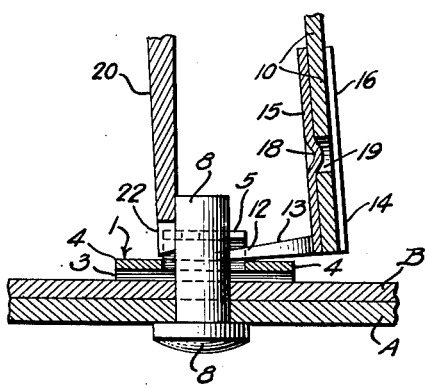

Referring now, more particularly, to the drawings, it will be understood that the tool of the present invention is provided for use in instances wherein it is desired to separate the parts of an assembly secured by a sheet metal spring nut applied to a stud connecting said parts, and it is necessary to remove the spring nut from the stud without damage to the stud or the spring nut in order that they may be reused with their original effectiveness in the same or a similar fastening assembly. In the present example, Figs. 2 and 3 show a fastening assembly of two or more parts A, B, secured by a spring nut 1 applied to the projecting end of a stud 8 defined by the shank of a rivet, or the like, extending through aligned apertures in said parts A, B. In a related fastening assembly, the part A may be made of plastic and provided with a connecting stud integrally molded thereon and adapted to project through an aperture in part B where it is secured by a similar spring nut 1 applied to the projecting end of such a stud 8.

The sheet metal or spring nut devices 1, are constructed from relatively thin sections of spring metal such as spring steel or cold rolled steel having spring characteristics. The spring nuts 1 are provided from blanks of various outlines but the most widely used form is constructed from a generally rectangular sheet metal section which is so stamped as to provide end portions 3 and bridge portions 4, between which integral yieldable tongues 5 or similar stud engaging elements project upwardly for engaging the associated connecting stud 8 under tension. The said end and bridge portions provide what may be termed, the body of the spring nut, which body is so formed in the stamping operation as to present a normally untensioned, generally bowed or concave base from which the said tongues 5 extend upwardly in substantially ogee formation. When such a spring nut 1 is applied to the shank of a stud or bolt 8, the yieldable tongues 5 readily slide along said stud until the spring nut engages the adjacent work surface B or other part secured; at such point, upon pressure on the generally concave base of the spring nut 1, the end portions 3 are moved from their initial, normally untensioned position in the generally concave base outwardly and upwardly in a substantial lifting force which is transmitted to the tongues 5 to urge the extremities thereof inwardly toward each other such that said extremities of the tongues 5 dig into and become embedded in the stud 8 to lock the spring nut in applied position on the stud against reverse movement or loosening. At the same time, the bowed bridge portions 4 of the spring nut are elongated such that the generally concave base of the spring nut assumes the position of a substantially flat section against the surface of the adjacent part B with no portions thereof projecting sufficiently to be engageable by a conventional tool, and accordingly, the spring nut 1 cannot be readily removed from applied position on the stud 8 except by a special tool such as a tool in accordance with the present invention.

The tool of the invention, designated generally T, preferably is in the form of a plier type of device comprising a pair of pivoted jaws 10 and 20 similar to those employed in flat nose pliers, or the like. The jaw 10 carries an integral or separably attached tool head comprising a pair of spaced claws 12, or the like, projecting from the inner face of said jaw 10 and formed with bevelled inner surfaces 13. The spaced claws 12 may be integrally provided on the jaw 10 either by extensions on said jaw 10 or by forming such claws 12 on a small plate which is welded to said jaw 10 to provide said claws 12 thereon in an equivalent manner.

Preferably the spaced claws 12 are provided in a detachable tool head arrangement such that the tool T is usable for removing different sizes of spring nuts by attaching to said jaw 10 the size of claws 12 best suited for removing a particular size of spring nut from attached position on its associated stud, as presently to be described. In the present example, the spaced claws 12 are provided on such a detachable tool head in the form of a socket 14 adapted to be removably connected onto said tool jaw 10. The socket 14 comprises a body portion 15 and inturned flanges 16 defining a sleeve having a generally rectangular passage snugly receiving the correspondingly shaped tool jaw 10 together with suitable retaining means such as detent 18 provided by a depression in said body portion 15 and adapted for snap fastening engagement in a recess 19 in said jaw 10 in the operative position of the socket 14 on said jaw 10.

The spaced claws 12, in any of the foregoing arrangements, are suitably spaced for receiving therebetween the stud 8 of a fastening assembly as seen in Fig. 2 and are bevelled downwardly toward their free ends, as shown in Fig. 3, to define chisel-like points leading to the upwardly inclined bevelled surfaces 13 on said claws 12. The arrangement is such that the chisel-like points of said claws 12 are readily inserted under the tongues 5 of a spring nut 1 as shown in Fig. 2, and when forced inwardly, the bevelled surfaces 13 on said claws 12 wedge against the undersides of said tongues 5 to produce a gradual lifting thereof as necessary to release the extremities of said tongues from fastening engagement with the stud 8, whereupon the spring nut may be easily and quickly removed from the stud.

The cooperating jaw 20 of said tool T is provided with a reduced end portion defining a small lug 22 adapted to fit between the extremities of the tongues 5 of the spring nut 1, as shown in Figs. 2 and 3, and bear against the adjacent side of said stud 8 along with the adjoining portion of said tool jaw 20. The jaw 20 including said lug 22 thus serves to support and bolster the stud 8 as the claws 12 on the other jaw 10 are applied to release the tongues 5 of the spring nut from said stud, as aforesaid. This is important in fastening assemblies in which the stud is fragile and subject to breakage or mutilation as, for example, where provided as an integral plastic stud on a plastic part such as a nameplate, or the like.

The tool T preferably is provided with suitable spring means for maintaining the pivoted jaws 10, 20, in normally open position while otherwise providing for automatic expansion of said jaws which facilitates the function of the tool in the procedure for removing the spring nut 1 from secured position on the associated stud 8, as presently to be described. In a preferred construction, such spring means for maintaining the jaws 10 and 20 in normally open position is obtained by providing the handles 30 and 32 of the tool with pins 34 projecting from the inner faces of said handles and supporting the ends of a coil spring 36 telescoped over the end of said pins 34.

In the application and use of the tool T for removing a spring nut from secured relation on a stud 8, the normally open jaws 10, 20, of the tool are fitted over the projecting end of the stud 8, as shown in Fig. 2, in position for the jaw 20 to engage one side of the stud 8 with the lug 22 thereon received in the space between the extremities of the tongues 5 and bearing against the stud 8 along with the adjoining portion of said tool jaw 20. The initially open jaws 10, 20, are moved toward each other by compressing the tool handles 30, 32, such that the tool jaw 20 including the lug 22 supports and bolsters the stud 8 against breakage or mutilation as the spaced claws 12 on the other jaw 10 are actuated for releasing the tongues 5 from securing engagement with the stud 8.

In this relation, the spaced claws 12 straddle the stud 8 as the chisel-like points of said claws 12 pry under the adjacent edges of the tongues 5 of the spring nut 1 substantially as shown in Figs. 2 and 3. Upon continued pressure on the tool handles 30, 32, to move the tool jaws 10, 20 toward each other, said spaced claws 12 move inwardly under said tongues 5 in a manner whereby the bevelled surfaces 13 on said claws provide a wedging action against the undersides of said tongues 5 which lifts the extremities of said tongues 5 out of fastening engagement with the stud 8. The tongues 5 are thus manipulated to a position in which the extremities of said tongues have little or no contact with the stud 8, and inasmuch as said tongues 5 otherwise are seated on said claws 12, the spring nut 1 is easily and quickly removed and withdrawn from the stud 8 by a simple axial pull on the tool. This is facilitated when the clamping force of the jaw 20 against the stud 8 is removed by slightly releasing the compression on the tool handles 30, 32, whereupon the coil spring 36 automatically moves the jaw 20 outwardly relatively to jaw 10 and out of contact with the stud 8 such that the spring nut 1 may be readily removed from said stud 8 by a simple axial pull on the tool, as aforesaid.

In the described use of the tool of the invention, a spring nut is removable from secured position on a stud in a matter of seconds and without danger of deforming the spring nut or breaking or mutilating the stud which is particularly important when the stud is made of plastic as an integral connecting stud on a plastic part. There is, otherwise, little or no change in the removed spring nut or the associated connecting stud from which it is removed such that these fastening elements are readily adapted for reuse with their original effectiveness in the same or a similar fastening assembly.

While the tool of the invention has been described in detail with a specific example, such example is intended as an illustration only inasmuch as the invention fully contemplates various modifications which may be provided without departing from the spirit and scope of the invention.

What is claimed is:

1. A tool for removing a sheet metal spring nut from secured position on a stud, said spring nut comprising a sheet metal body having a pair of opposite tongues extending out of the plane thereof with the extremities of said tongues engaging said stud, said tool comprising a pair of pivoted tool heads, one of said tool heads comprising a pair of spaced claws projecting from the inner face thereof toward the other tool head, said claws having their inner surfaces bevelled downwardly toward their free ends and being adapted to pass under said tongues of the spring nut at one side of said stud, said other tool head being adapted to bear on the opposite side of said stud as said spaced claws are manipulated to cause said bevelled surfaces thereon to release the extremities of said tongues from fastening engagement with said stud whereby the spring nut may be removed from said stud.

2. A tool for removing a sheet metal spring nut from secured position on a stud, said spring nut comprising a sheet metal body having a pair of opposite tongues extending out of the plane thereof with the extremities of said tongues engaging said stud, said tool comprising a pair of pivoted tool heads carried by handles, spring means included in said tool for maintaining said tool heads in normally spaced apart relation but movable toward each other by said handles, one of said tool heads comprising a pair of spaced claws projecting from the inner face thereof toward the other tool head, said claws having their inner surfaces bevelled downwardly toward their free ends and being adapted to pass under said tongues of the spring nut at one side of said stud, said other tool head being adapted to bear on the opposite side of said stud as said spaced claws are manipulated to cause said bevelled surfaces thereon to release the extremities of said tongues from fastening engagement with said stud whereby the spring nut may be removed from said stud.

References Cited in the file of this patent

UNITED STATES PATENTS

| | | |
|---|---|---|
| 533,923 | Seyfriedt | Feb. 12, 1895 |
| 950,849 | Hammond | Mar. 1, 1910 |
| 1,615,717 | Moore | Jan. 25, 1927 |
| 1,708,848 | O'Toole | Apr. 9, 1929 |
| 2,068,024 | Harvey | Jan. 19, 1937 |
| 2,356,400 | Hanson | Aug. 22, 1944 |
| 2,679,776 | Filip | June 1, 1954 |